INVENTOR
HENRY THOMAS WOLLMAN

United States Patent Office 3,420,710
Patented Jan. 7, 1969

3,420,710
PROCESS AND APPARATUS FOR CLEANING WEBS UTILIZING A SONIC AIR BLAST
Henry Thomas Wollman, Little Silver, N.J., assignor to E. I. du Pont de Nemours and Company, Wilmington, Del., a corporation of Delaware
Filed Sept. 3, 1964, Ser. No. 394,211
U.S. Cl. 134—1
Int. Cl. B08b 7/04, 5

8 Claims

ABSTRACT OF THE DISCLOSURE

A method of cleaning the surface of a traveling web by removing particulate matter held on said surface by a strong electrostatic bond or located within the boundary layer of air adjacent the traveling web, by exposing said surface to a shock wave created by air directed against said surface at at least sonic velocity to dislodge said particles and removing the dislodged particles at reduced pressure.

---

Figure 1:
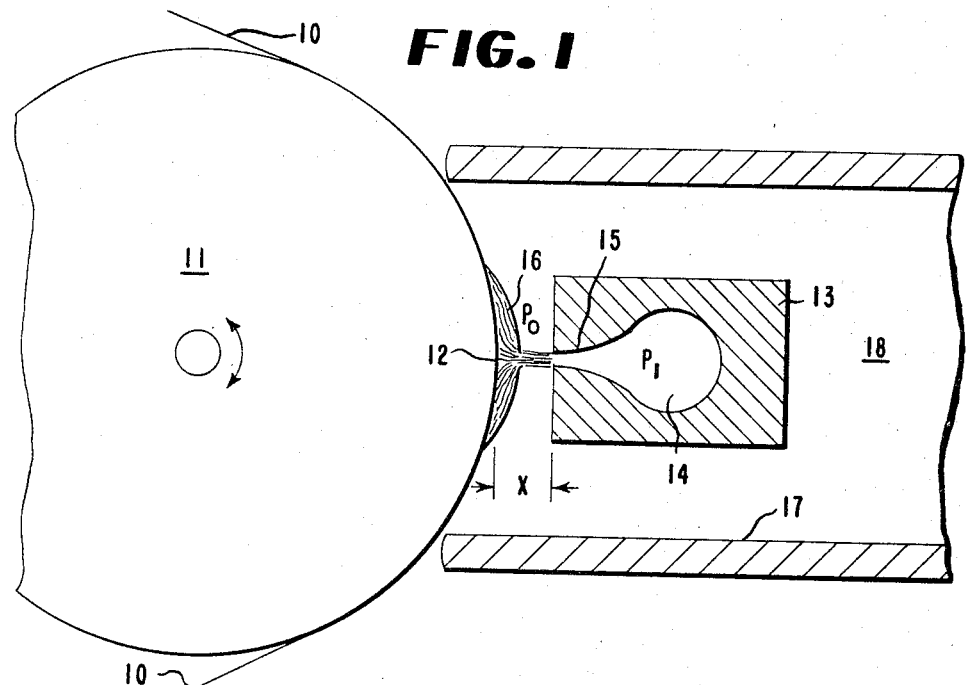

This invention relates to a method for continuously cleaning the surface or surfaces of shaped articles. The invention also relates to apparatus for carrying out the method.

One of the problems encountered in industrial and manufacturing operations involving webs, filaments or sheets of material is the effective cleaning of the surfaces of the material. This is particularly true in many coating and printing operations wherein if the surface of the material undergoing the operation contains dust, dirt, lint, or other surface particulate matter, various defects in the final product may result. Additionally, some articles of manufacture such as film strips, cine film, magnetic tape, etc., readily pick up dust, dirt and lint; these materials accumulate on or become embedded in the surface of the strip. If this matter is not removed by some means, it may cause scratching or damage to the article during use.

The prior art teaches various methods to solve these problems. One is the use of brushes or tacky rolls that are held against the surface to be cleaned and relative motion is provided in such a manner that the brushes or rolls remove the foreign matter. This method is sufficient for many operations, but it will not remove minute particles and it cannot be used when the material being cleaned is such that physical contact with the surfaces should be avoided during the cleaning stage of the operation. The prior art also teaches the process of running the material through a tank containing a cleaning medium with ultrasonic energy. These methods, since the material is immersed in a liquid cleaning medium, have the disadvantage that they require the additional step of drying and, in some applications, solvent recovery before subsequent operations may take place. Other methods known in the art involve the use of a blast of compressed air, suction producing devices, or the use of a compressed air blast in combination with suction removal means. These techniques are adequate for removing particulate matter attached to the surface of the material by a weak bond, but they are not adequate when the matter is very minute or held to the material by a strong bond such as a strong electrostatic bond.

This invention will be illustrated and described in connection with a method of cleaning foreign particulate matter from the surface of a moving web of film support prior to coating the support with a photographic emulsion. It should be understood that such illustrations and descriptions are merely exemplary in that the invention may be adapted with little or no modification to other operations wherein similar cleaning problems exist.

In the usual method of manufacturing photographic films and papers, a photosensitive emulsion is coated onto a support or film base. The support is usually in web form and can be paper or films composed of the cellulose esters, e.g., cellulose triacetate, cellulose acetate/butyrate; various superpolymers, polyvinyl acetals and polyesters, e.g., polyethylene terephthalate. If the support material has foreign particulate matter on its surface during the coating operation, this matter can cause small areas of the base to remain uncoated. These areas are known in the art as repellent spots and are responsible for yield losses in the photographic industry. Additionally, the matter may be coated and create sensitized or desensitized spots in the coated emulsion and the film containing these spots must be scrapped.

During the manufacture of the various film supports it is difficult to obtain webs of the support with surfaces which are completely free from foreign matter. Therefore some method of removing this matter from the surface or surfaces to be coated is necessary. The various methods used previously by the photographic industry have not proved to be particularly successful, and one of the reasons for this is thought to be the strong bond that exists between some of the foreign matter and the film base. Another cause is thought to be that many of the particles that cause repellency are very small in size and lie within the boundary layer of air adjacent to the web surfaces. This boundary layer is not disturbed by the usual cleaning methods such as blasts of compressed air or suction means, therefore the foreign particle are not usually dislodged by these means.

Therefore, it is an object of this invention to provide an effective method of cleaning the surface of shaped articles such as webs, filaments, wires, etc. It is another object to provide an effective method of cleaning the surface or surfaces of shaped articles without physical contact and without subjecting the article to a liquid medium and a subsequent drying operation. It is a further object to provide a method of cleaning that will remove all the particulate matter on the surface of the shaped article, even that matter held by a strong electrostatic bond or located within the boundary layer of air adjacent the surface of the article. It is a still further object to provide a method for removing the particulate matter from the surface of the shaped article being cleaned and further removing this matter from the vicinity so that the cleaned article will not be recontaminated. It is a further object to provide a method of cleaning a web of photographic film base such that it may be coated with a photosensitive emulsion and be free from repellency and sensitized or desensitized spots caused by particulate matter on the surface of the support.

Another object is to provide an economical safe and rapid process for cleaning shaped articles and one that can be used in an in-line manner in many existing industrial operations. A still further object is to provide apparatus for cleaning webs. Other objects will appear hereinafter.

These and other objects are accomplished by the following process for cleaning the surface or surfaces of shaped articles which comprises (a) exposing a shaped article to a cleaning zone; (b) creating a shock wave in said cleaning zone by passing air at a pressure $P_1$ to a lower pressure $P_0$ where the ratio of $P_0/P_1$ is no greater than 0.528, and (c) directing said shock wave across the surface to be cleaned of said shaped article. The shock waves dislodge the contaminating particles on the article's surface and if desired, the dislodged particles may be removed by vacuuming the particles from the cleaning zone. It is to be understood that the reference to shaped articles as used herein is intended to include webs, filaments, wires, foils, sheet material which can be processed batchwise and also continuous lengths of material which can be processed continually without interruption.

A preferred apparatus for performing the cleaning operation comprises in combination support means to back the web and means for producing shock waves by a flow of air having at least sonic velocity, said flow means being located adjacent to the support means to allow the shock waves to flow upon the exposed surface of the web.

The apparatus can have several embodiments as will be explained hereinafter. The main requirement of the apparatus is that it produce, direct, and maintain aerodynamic shock waves such that they flow on the surface to be cleaned. These aerodynamic shock waves can be produced by either the expansion or compression of an air stream as it leaves a nozzle at sonic or supersonic velocity.

Figure 2:
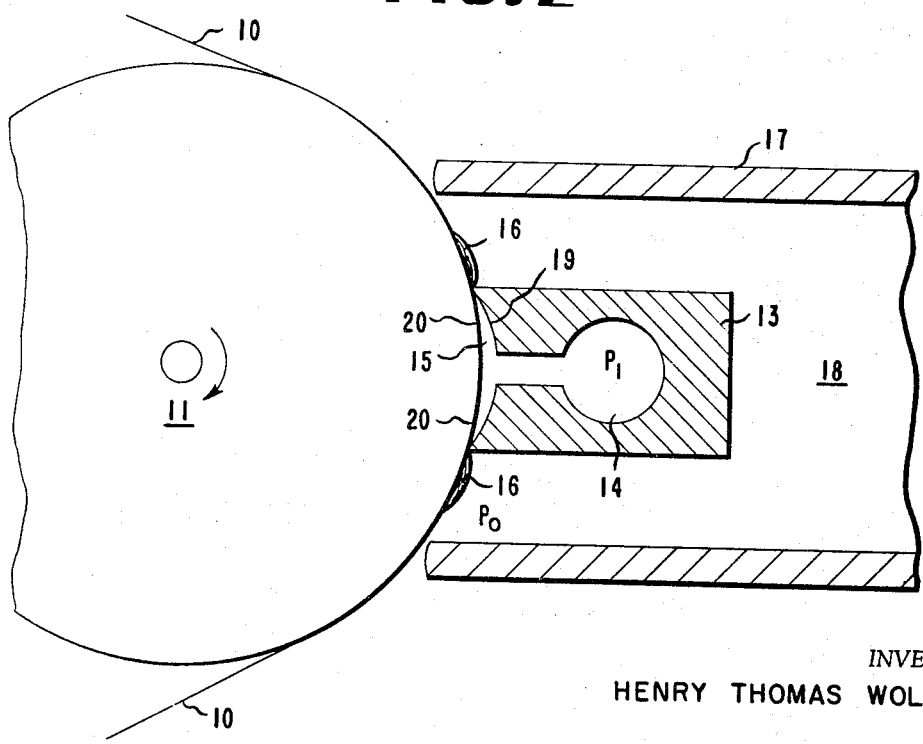
Figure 3:
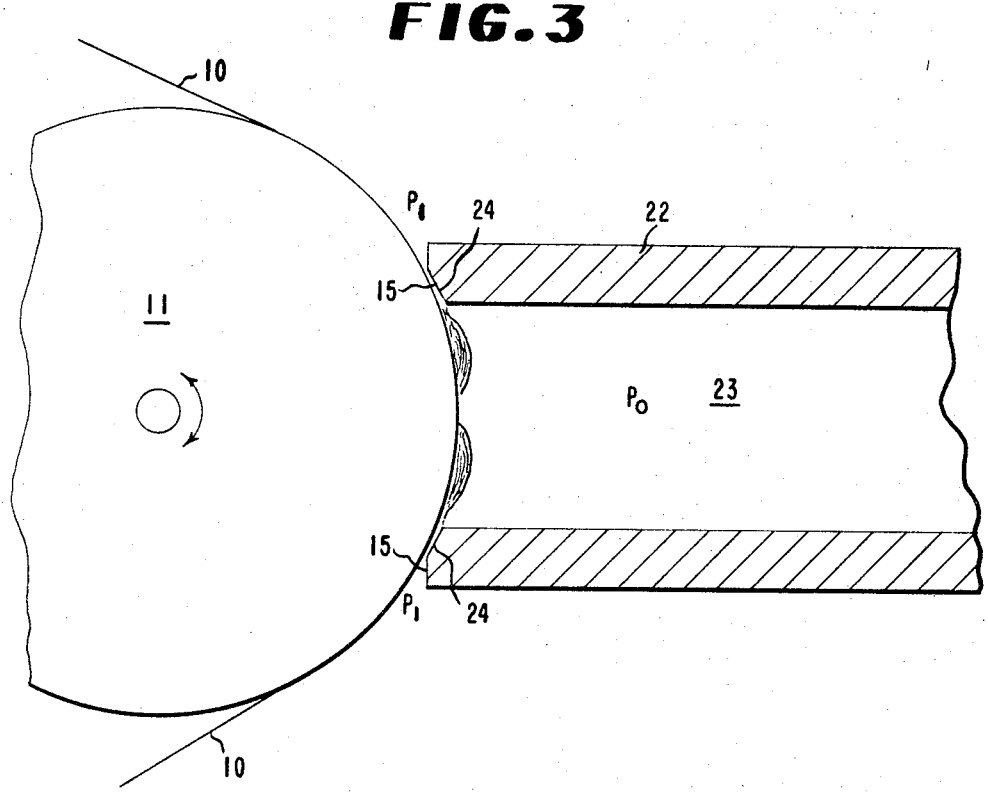

The invention will be further illustrated by reference to the accompanying drawing wherein FIGURE 1 is a side elevation of an embodiment of the invention with parts in section. FIGURE 2 is a side elevation of another embodiment of the apparatus of the invention. FIGURE 3 is a side elevation of as yet another embodiment of the invention with parts in section.

With respect to FIGURE 1, a web 10 of photographic base material is put into motion by suitable means (not shown) and it runs around a support roller 11 with the surface to be cleaned outwardly exposed. The support roller can be a simple idler roll or if desired it can be a vacuum roll, in any event its primary function is to support the web opposite the point of air impingement 12.

Adjacent the supporting roller is located a nozzle housing 13. This housing is composed of a plenum 14 connected to a source of compressed air (not shown) and a nozzle section 15. The nozzle extends at least the width of the web surface to be cleaned. The nozzle section can have various configurations, the only requirement is that sonic or supersonic air velocity (i.e., above 1100 feet/sec.) be obtained when the air exits from the nozzle. To obtain sonic or supersonic air velocity the pressure ratio downstream $P_0$ to upstream $P_1$ of the nozzle must be equal to or less than the critical pressure ratio for air (0.528). Thus in designing the nozzle, its length, throat area, cross-section, and whether or not it has a diverging section are not critical; all that is necessary is that the ratio of $P_0/P_1$ be equal to or less than 0.528. However, it has been found that when the distance between the top and bottom of the throat section of the nozzle is less than approximately 0.005 inch, it is difficult to produce sonic velocity because of the friction of the boundary layers within the nozzle.

As the air passes out of the nozzle it expands to supersonic velocity. The air forms a jet 16 and this jet stream flowing at sonic speed or greater produces a series of shock waves and the air jet strikes the surface of the web while still at sonic speeds. Thus a singular shock front or a complicated shock pattern is maintained in the jet. When the shock waves are applied to the surface of the web, the combination of the high velocity air and the shocks caused by the shock waves dislodge the surface particulate matter clinging to the web. The shock waves contained within the jet of impinging air as they move across and in contact with the film surface will disturb the boundary layer of the air adjacent to the film surface and dislodge any particulate matter lying within that layer. Also the shock waves will dislodge particulate matter held to the web with a strong electrostatic force. The severity of the shock pattern is increased by decreasing the operating pressure ratio, i.e., increasing the pressure $P_1$ within the plenum. This can easily be accomplished by regulating the supply of compressed air.

The clearance or distance X between the nozzle exit and the point of air impingement 12 on the web is maintained such that the jet of air will still be at sonic speeds at the point of impingement. When the air stream is directed at the web in the fashion disclosed in FIGURE 1, the presence of the web disturbs the flow of the jet and causes it to split and follow the surface of the web. Since the section of the jet flowing along the surface of the web is still at sonic velocities, this section of the jet will also produce a series of shocks or discontinuities of flow which dislodge the foreign matter as explained previously.

The clearance X will vary for different operations but basically this distance is a function of the area to be cleaned, the desired effectiveness of the cleaning, and the pressure $P_1$ supplied to the nozzle. Suitable means (not shown) can be provided for adjustment of this clearance by moving either the supporting roller 11 or the nozzle housing 13 relative to the other.

In application where recontamination of the web is to be prevented, the surface particulate matter dislodged from the web is removed from the vicinity by a vacuum system. To perform this function, a vacuum housing 17 fits closely around an area of web on the support roller or the area of the web to be cleaned can be isolated from the atmosphere by a labyrinth seal. This fit is such that a slight flow of atmospheric air will flow from outside the housing into the vacuum chamber 18. The vacuum chamber is connected to a vacuum source (not shown) which maintains a pressure within the chamber that is negative with respect to atmospheric pressure. In operation, the mixture of air and particulate matter from the cleaning operation and a slight flow of air from outside the vacuum housing will flow away from the web toward the vacuum source. This air can subsequently be filtered by suitable means so that the particulate matter is caught in a depository. After the web has been cleaned it can be coated with a gelatinous silver halide photographic emulsion by various means (not shown).

It should be noted that the process of the invention does create a high noise level, and if desirable a noise suppression system (not shown) can be incorporated into the process. In an exemplary noise suppressor, the entire cleaning unit is surrounded by a housing made of perforated sheet steel. Within the housing is a lining of sound absorbing material that will not flake off or create additional cleaning problems, e.g., a lining of heavy density urethane foam.

FIGURE 2 illustrates another embodiment; this apparatus in function is very similar to that of FIGURE 1, the basic differences being in the design, location and structure of nozzle and the direction of the flow of the jet. In this embodiment the nozzle housing 13 contains the plenum 14 and only one side 19 of the nozzle 15. The web 10 on the supporting roller 11 forms the other side 20 of the nozzle. In operation compressed air from the plenum enters the nozzle and is expanded to sonic or supersonic velocity as it exits at two locations, i.e., in effect there are two nozzles. The flow of the jets 16 from the nozzles is parallel to the surface of web and these jet contain the shock waves and patterns that dislodge the foreign matter from the surface of the web. If desired, this embodiment can also have a vacuum system to prevent recontamination.

FIGURE 3 illustrates another embodiment, i.e., one in which the use of compressed air is not necessary. In this apparatus, an area of the web 10 on the supporting roller 11 is surrounded by a housing 22 adjacent the roller. The housing contains a vacuum chamber 23 connected to a vacuum source (not shown). The housing does not fit tightly against the web on the roller. The ends 24 of the housing next to the web have the configuration of one side of a nozzle. These ends in coopera-

References Cited

UNITED STATES PATENTS 3,239,863  3/1966  Gardner _____ 134— 1 XR

OTHER REFERENCES

Perry's Chemical Engineers' Handbook, fourth edition, McGraw-Hill, New York, N.Y., 1963 (pages 5-9 and 5-10 relied upon).

MORRIS O. WOLK, *Primary Examiner.*

BARRY S. RICHMAN, *Assistant Examiner.*

U.S. Cl. X.R.

134—15, 21, 37; 15—306